United States Patent

[11] 3,614,596

[72] Inventors David E. Ford, Jr.
Milwaukee;
Richard W. Waltz, New Berlin, both of Wis.
[21] Appl. No. 9,213
[22] Filed Feb. 6, 1970
[45] Patented Oct. 19, 1971
[73] Assignee Allen-Bradley Company
Milwaukee, Wis.

[54] CONTROLLED RECTIFIER FIRING CIRCUIT
7 Claims, 1 Drawing Fig.

[52] U.S. Cl. .......... 323/22 T, 307/252 N, 307/265, 307/301, 323/33, 318/227
[51] Int. Cl. .......... G05f 1/44
[50] Field of Search .......... 323/22 SC, 34, 16, 31, 33; 318/227; 307/247, 252 N, 265, 301; 328/137, 139

[56] References Cited

UNITED STATES PATENTS 3,387,196 6/1968 Graham et al. .......... 318/227
3,465,236 9/1969 James .......... 323/22 X (SC)
3,488,521 1/1970 Smith .......... 323/22 X (SC)
3,496,453 2/1970 Swain .......... 323/22 SC

*Primary Examiner*—Gerald Goldberg
*Attorneys*—Thomas O. Kloehn and Arthur H. Seidel

ABSTRACT: A summing circuit generates a DC command signal with magnitude proportional to the desired power to be conducted by a power SCR in a motor circuit. A unijunction transistor phase shift circuit receives the command signal and translates its magnitude to a firing angle by connecting the base circuit to an AC reference signal source and the emitter to a capacitor charged by the command signal and the AC reference signal. A sensitive SCR connected to the AC source is fired by the unijunction transistor to charge a capacitor of an oscillator, the output of which is amplified and transformer coupled to the gate of the power SCR.

PATENTED OCT 19 1971 3,614,596
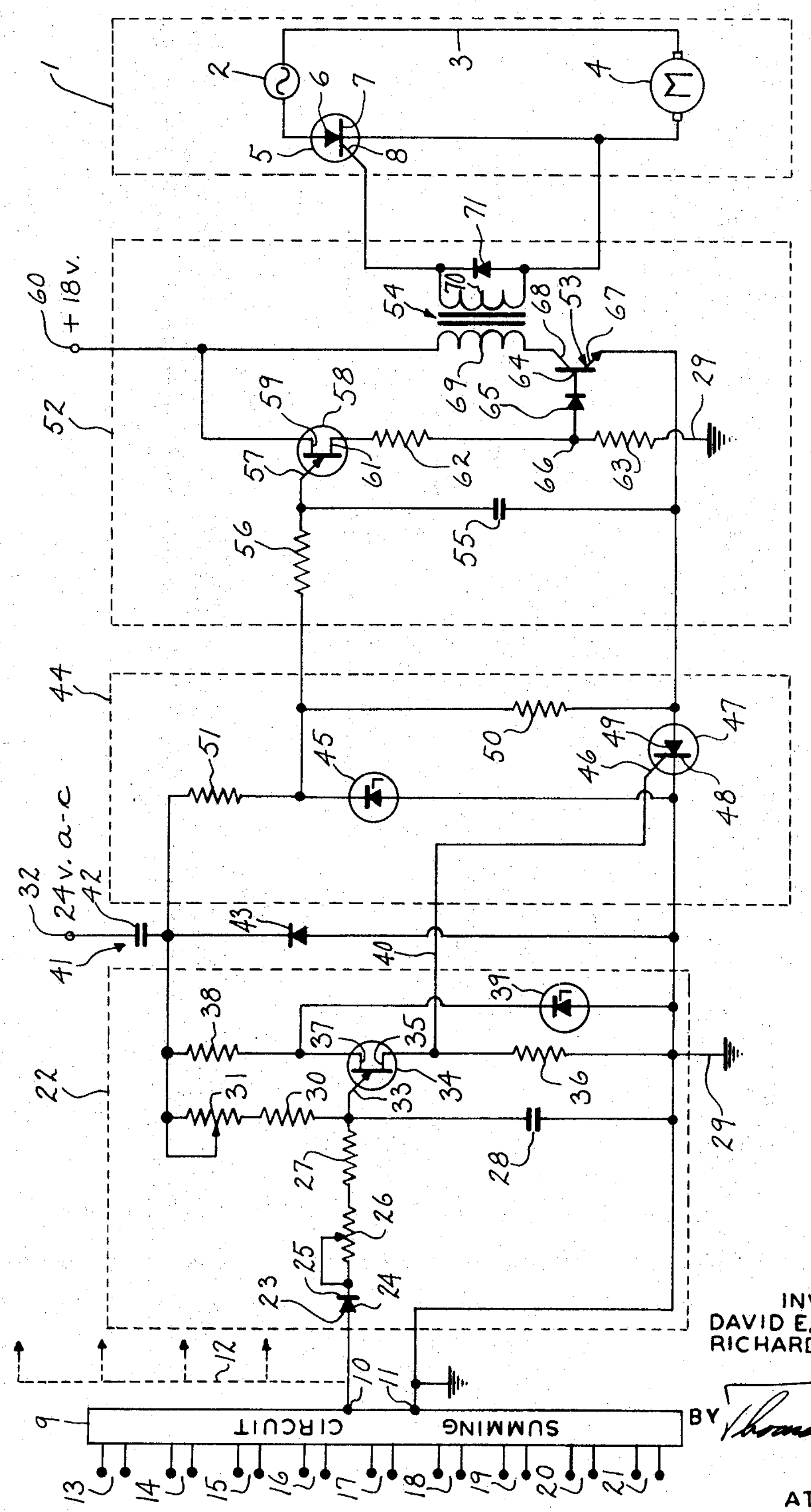
INVENTORS
DAVID E. FORD
RICHARD W. WALTZ
BY Thomas O. Klade
ATTORNEY

CONTROLLED RECTIFIER FIRING CIRCUIT

BACKGROUND OF THE INVENTION

The present invention is a circuit created to provide a firing signal for firing a controlled rectifier. Silicon-controlled rectifiers (hereinafter abbreviated as SCR) have largely replaced the analogous electronic component, the thyratron, for controlling power circuits. Both the SCR and the thyratron commonly operate in an AC power circuit to rectify the power and to provide a desired average power to a load. Both components may be considered three element devices, two of which are series connected in the power circuit between the source and the load and the third of which is a gate or grid controlling the conductivity of power across the other two elements. Both components conduct in the presence of two conditions: one, when the power circuit imposes at least a minimum forward bias across the anode to cathode elements, and, two, when a firing signal of minimum magnitude is imposed upon the gate element or grid. The SCR is a current-operated device requiring a minimum amperage of gate current to render it conductive in the presence of a forward bias, and the SCR, like the thyratron, continues to conduct regardless of the signal on the gate so long as a forward bias exists across the anode cathode element. Hence the firing signal must arrive at the gate element at the right time, i.e., when a forward bias is imposed across the anode-to-cathode circuit, and the firing signal must supply sufficient current to trigger the component. The amount of power conducted to the load is determined by the time i.e., in the forward bias portion of the power cycle, firing angle, when the component is rendered conductive. Hence, if the SCR or thyratron begins conducting early in the forward bias half-cycle, a large amount of power will be transmitted to the load, but if the SCR or thyratron is triggered late in the forward biasing half-cycle a relatively small quantity of power will be transmitted to the load.

Although the type of load driven by the power circuit to be controlled by a thyratron or an SCR may vary, e.g., a heating load, a lighting load, AC or DC, etc., the diagram in the described embodiment of the present invention is concerned with controlling the power from an AC source to a DC motor so as to achieve or maintain the desired motor operation. The desired motor operation in the simplest application may be indicated by a DC signal from a speed-controlled potentiometer that is manipulated by a human operator. In more sophisticated systems, the desired motor operation will be indicated by a DC signal from a circuit that combines signals from speed control potentiometers, feedback sources, and signals from auxiliary system to produce a command signal indicating the desired or necessary motor response to all of these conditions. Such information residing in a level of DC magnitude must be converted to a precisely timed current pulse that appears on the gate of the SCR at that instant in the forward bias cycle which is a function of the DC level of the command signal. Hence the present invention converts a varying DC magnitude to a current pulse of a firing angle proportional to the DC magnitude. To achieve the desired result, such a control circuit must be able to cope with ever-present electrical noise, which would distort the timing of the firing pulse, as well as noise or other electrical vagaries in the power circuit affecting the bias across the SCR at the instant the trigger signal appears at the SCR gate. To be a standardized motor regulator circuit capable of controlling any motor within a given power range in any application, versatility, as well as reliability and stability are the sine qua non of a useful circuit. Compactness and ruggedness are likewise important attributes for such a circuit. Finally, to be useful, such a circuit must be not only technically possible, but its cost must lie within that range that makes it economically feasible.

SUMMARY OF THE INVENTION

The present invention relates to a firing circuit for a controlled rectifier that is connected in a power circuit to be controlled. More particularly, the invention resides in such a firing circuit that has a phase shift circuit which receives a command signal of varying magnitude and an AC reference signal of the same phase as the power to be controlled and which converts the command signal magnitude to a phase shift signal of proportional phase angle relative to said reference signal, that has a pulse-forming circuit connected to receive said phase shift signal and which originates a pulse of electrical energy whenever it receives said phase shift signal, and that has a pulse-firing circuit which is connected to a gate element of a controlled rectifier in a power circuit to be controlled and which has an oscillator connected to receive said pulse of electrical energy and to generate a train of firing signals for each pulse of electrical energy.

The control circuit described in the preceding paragraph provides a precisely timed train of firing signals to the gate element of the controlled rectifier when the power circuit has forward biased the controlled rectifier. Each firing signal in the train is a high-current signal. However, due to the short duration of each firing signal and the relatively high frequency of the firing signals in the train, the train provides the advantages of continuous high-current firing signal while subjecting the gate circuit of the controlled rectifier to relatively low power. Thus the controlled rectifier firing circuit of the present invention reliably ensures accurate firing of the controlled rectifier to the end that the average power conducted by the controlled rectifier will be a function of the magnitude of the command signal. The controlled rectifier firing circuit of the present invention also achieves virtually a complete isolation of the output firing circuit from the input command and reference signal, as a consequence of which, electrical noise can be eliminated from the train of firing pulses and the controlled rectifier firing circuit is insensitive to noise. This same isolation of input and output signals allows a great range of versatility. Also, the controlled rectifier firing circuit of the present invention is a static, solid-state device and hence it may be compact, lightweight, rugged, stable and readily adapted for use in virtually any environment.

BRIEF DESCRIPTION OF THE DRAWING

The drawing is a schematic diagram of a circuit embodying the present invention.

DETAILED DESCRIPTION OF PREFERRED EMBODIMENT

The preferred embodiment of the invention is designed to control a power circuit 1 which is represented in the schematic diagram by an AC power source 2 that is connected by a powerline 3 to a DC motor 4 through an SCR 5. The SCR 5 has an anode 6, connected to the AC source 2 and a cathode 7 connected to the motor 4. The firing signal from the circuit of the present invention is transmitted to a gate 8 of the SCR 5.

The firing current for the SCR 5 flows from the gate 8 to the cathode 7. For the SCR 5 to conduct, it must be forward biased by the AC source 2 and during that period of forward bias a current of at least a certain minimum amperage must flow through the gate circuit from the gate 8 to the cathode 7 and back to the gate. Such a firing current through the gate to cathode circuit at an instant when the SCR 5 is forward biased by the source 2 will render the SCR 5 conductive and the SCR 5 will remain conductive until the forward bias is removed. Should the firing signal arrive on the gate 8 at an instant when the requisite forward bias is not present, the firing signal will have no effect on the conductivity of the SCR 5. Hence, although only a spike of firing current is necessary to trigger the SCR 5, a firing signal made up of a single spike of current runs a high risk of failing to fire the SCR 5 since its arrival at the gate 8 could coincide with a reverse biasing transient, or, where maximum power is called for, the firing signal could arrive an instant ahead of the requisite forward bias, and in either case no power at all would be conducted to the motor 4.

In this embodiment, the command signal bearing the information indicating the power to be transmitted from the source to the motor 4 is generated in a summing circuit 9 which is the subject matter of a copending application by the same inventors as the present invention, owned by the same assignee as the present application and filed on Feb. 6, 1970, Ser. NO. 9,216. The command signal appears across output terminals 10 and 11 on the summing circuit 9. Connected to the output terminal 10 along with the solid line is a phantom line 12 representing any arbitrary number of circuits identical to that shown to the right of the summing circuit 9 which might be attached to the summing circuit 9 to receive a command signal therefrom. To control a three-phase source, each containing one or more SCR's, at least two additional control circuits would be connected across the output terminals 10 and 11 of the summing circuit 9. In some applications two or more motors may be controlled from the summing circuit 9, or it may be desirable to use two or more SCR's to control a single phase of power. The command signal is a DC signal of varying magnitude, the magnitude being proportional to the power requirements of the motor 4 to attain or maintain a desired speed. The magnitude of this DC command signal is a function of the sum of plurality of input signals appearing across input terminals 13, 14, 15, 16, 17, 18, 19, 20 and 21. The number of pairs of input terminals 13–21 is arbitrarily selected here to represent any number of input terminals that might be required for any particular application. The input signals could come from feedback sources, speed control potentiometers, or other signals indicating the condition or operation of auxiliary functions, and the like.

The command signal from the summing circuit 9 is transmitted to a phase shift circuit 22 by means of a conductor that connects the output terminal 10 to an anode 23 of an isolating diode 24. The isolating diode 24 has its cathode connected through a current control potentiometer 26 and a current-limiting resistor 27 to a timing capacitor 28, the other plate of which is connected to a common ground 29, along with the other output terminal 11 of the summing circuit 9. The timing capacitor 28 is also connected to be charged through a time constant resistor 30 and timing potentiometer 31 by a reference signal received on a reference signal input terminal 32. The reference signal is a sinusoid of the same phase and frequency as the AC power from the AC power source 2 to the anode 6 of the power SCR 5. The sinusoid is raided by a fixed DC magnitude by means described infra, and consequently the positive level of this sinusoid has a duration greater than 180° and the negative portion of the sinusoid has a corresponding duration less than 180°. The isolating diode 24 serves to isolate this DC bias level to prevent its level from being a function of the setting on resistor 26 or the impedance of circuit 9.

The timing capacitor 28 is connected to an emitter 33 of the unijunction transistor 34, which serves as a switching device to discharge it. The unijunction transistor 34 has a base-one 35 which is connected through a voltage drop resistor 36 to the common ground 29 and it has a base-two 37 which is connected through a current-limiting resistor 38 to the reference signal input terminal 32. A zener diode 39 is connected between the base terminal 37 of the unijunction transistor 34 and the common ground 29 and it is oriented with its cathode connected to the base-two 37 so as to clip the positive half of the asymmetrical sinusoid and shunt it to common ground 29. The conductivity of the emitter 33 to the base-one 35 circuit of the unijunction transistor 34 is thus determined by the gradient across the base-two 37 to base-one 35, terminals of the unijunction transistor 34 and the charged level of the timing capacitor 28 on the emitter 33. When the charge level of the capacitor 28 reaches a predetermined level relative to the gradient across the base-two 37 to base-one 35 terminals of the unijunction transistor 34, the unijunction transistor 34 fires, discharging the timing capacitor 28 through emitter 33 to base-one 35 circuit to generate an output voltage across the voltage drop resistor 36. An output conductor 40 conducts the output voltage spike out of the phase shift circuit.

The asymmetrical sinusoid reference signal is generated by a DC restorer network 41 which is connected to the reference signal input terminal 32. As mentioned, an AC signal of the same phase and frequency as the power from the AC source 2 at the anode 6 of the SCR 5 is transmitted to the reference signal input terminal 32. The DC restorer network inserts a positive DC component into the AC reference signal to make it asymmetrical. The DC restorer network 41 is made up of a restorer capacitor 42 which is connected to the reference signal input terminal 32 and a blocking diode 43 which is connected between the restorer capacitor 42 and the common ground 29. During the negative half-cycle of the sinusoid reference signal on the reference signal input terminal 32, the blocking diode 43 presents a low-resistance path so that the restorer capacitor 42 may be rapidly charged. When the polarity of the sinusoid on the reference signal input terminal 32 reverses, the restorer capacitor 42 very slowly discharges through the high resistances in circuitry to be described, since the discharge path is blocked by the blocking diode 43. Thus the DC level is inserted into the sinusoid of the reference signal on the reference signal input terminal 32, incidentally, which is a 24-volt AC signal.

The restorer capacitor 42 is also connected to a pulse-forming circuit 44 to power the pulse-forming circuit with the asymmetrical reference signal, the positive peak of which is clipped by a zener diode 45 which is connected in series with a current-limiting resistor 51 across the blocking diode 43. The output spike signal from the phase shift circuit 22 is carried by the output conductor 40 to a gate 46 of a sensitive SCR 47 which has its cathode 48 connected to the common ground 29 and its anode 49 connected to one end of the voltage drop resistor 50 which is connected in series with the current-limiting resistor 51 and a restorer capacitor 42. Thus when the sensitive SCR 47 is fired by a spike from the phase shift circuit 22, the flat top pulse of the asymmetrical reference signal, which is clipped by the zener diode 45, appears across the voltage drop resistor 50 which is connected across the input of a pulse-firing circuit 52.

The pulse-firing circuit 52 is essentially a relaxation oscillator with its output connected through an amplifier transistor 53 and coupled out by an output-coupling transformer 54. The relaxation oscillator has an oscillator capacitor 55 which is connected across the voltage drop resistor 50 of the pulse-forming circuit 44 through a coupling resistor 56 and between the reference signal source and the sensitive SCR 47 in the pulse-forming circuit 44. The oscillator capacitor 55 is also connected to an emitter 57 of an oscillator unijunction transistor 58. The unijunction transistor 58 has a base-two 59 which is connected to a positive 18-volt DC source on a DC input terminal 60. A base-one 61 of the unijunction transistor 58 is connected through a pair of divider resistors 62 and 63 to the common ground 29. The amplifier transistor 53 has a base 64 which is connected through a bias diode to a junction 66 between the two divider resistors 62 and 63 so that the amplifier transistor 53 will be turned on by an output from the base-one 61 of the unijunction transistor 58. The amplifier transistor 53 has its emitter 67 connected back to the oscillator capacitor 55 to provide a discharge circuit for the oscillator capacitor 55 and connected to the common ground 29 through the sensitive SCR 47 in the pulse-forming circuit 44. A collector 68 of the amplifier transistor is connected through a primary 69 of the output-coupling transformer 54 to the 18-volt DC source on the DC input terminal 60. The output-coupling transformer 54 has its secondary 70 connected in parallel with a rectifier 71 across the gate-8-to-cathode-7 circuit of the power SCR 5 to couple a train of firing signals to the gate-8 of the power SCR 5.

In considering the operation of the controlled rectifier firing circuit disclosed, assume first that no command signal is appearing across the output terminals 10 and 11 of the summing circuit 9. The timing capacitor 28 in the phase shift circuit 22 is then charged solely by the asymmetrical reference signal received through the DC restorer network from the reference signal input terminal 32. The timing potentiometer 31 in series with the timing capacitor 28 is set to delay the charging of the timing capacitor 28 such that the charge level of the timing capacitor 28 reaches the peak point of the emitter 33 to base-one 35 circuit of the unijunction transistor 34 at the instant when the sinusoidal reference signal goes through zero to the negative portion of its cycle. Thus, when a command signal is transmitted from the output terminals 10 and 11 of the summing circuit 9 so as to add to the charge of the timing capacitor 28, the firing time of the unijunction transistor 34 will be a function of the magnitude of the command signal from the summing circuit 9. Since the unijunction transistor 34 requires a certain minimum positive voltage gradient across its base-two 37 to base-one 35 circuit for capacitor 28 to be charged, the reference signal is elevated with the DC level to make it asymmetrical and thus increase the duration of the positive portion of its cycle beyond 180° so that the duration of necessary positive voltage gradient across the base-two 37 to base-one 35 circuit of the unijunction transistor 34 will be approximately 180° in duration with respect to the positive half-cycle of the AC power from the AC power source 2 at the anode 6 of the power SCR 5 in the power circuit 1 being controlled. When the voltage gradient across the unijunction transistor 34 is negative, the capacitor 28 is discharged.

When the unijunction transistor 34 in the phase shift circuit 22 fires, discharging the timing capacitor 28 through the emitter 33 to base-one 35 circuit, it develops a voltage drop across the drop resistor 36 and this voltage spike is carried by the output conductor 40 to the gate 46 of the sensitive SCR 47. Since the voltage gradient across the anode 49 to cathode 48 circuit of the sensitive SCR 47 comes from the asymmetrical reference signal, an output spike appearing from the phase shift circuit 24 will arrive when a forward bias is imposed across the anode 49 to cathode 48 circuit of the sensitive SCR 47 to fire the sensitive SCR 47. When the sensitive SCR 47 fires, a flat top output pulse, which is a relatively square pulse of energy, is transmitted through the coupling resistor 56 to charge the oscillator capacitor 55 in the pulse-firing circuit 52, the charging circuit of which is completed to common ground 29 by the sensitive SCR 47 which functions as a switch means in the charging path. The oscillator capacitor 55 charges rapidly through the coupling resistor 56 firing the oscillator unijunction transistor 58 to discharge and then recharging so as to generate a train of oscillator pulses to the base 64 of the amplifier transistor 53 through the bias diode 65. The function of the bias diode 65 is to establish a low, fixed voltage drop across it in the forward direction to ensure a minimum signal before the amplifier transistor 53 is fired. The train of pulses from the oscillator unijunction transistor 58 causes a train of DC pulses to flow through the primary 69 of the output coupling transformer 54 and these pulses appearing on the secondary 70 of the output coupling transformer 54 have their positive force transmitted to the gate 8 of the power SCR 5.

The train of firing pulses through the gate circuit 8 of the power SCR 5 have amplitudes of approximately 17 volts open circuit and a current level of approximately 1.6 amperes short circuit. The rise time of each pulse is 0.3 microseconds and the duration of each pulse is approximately 15 microseconds. The frequency of the firing pulses is 2.5 Hz. The length of the chain of firing pulses will be coextensive with the duration of the pulse-sensitive SCR 47 of the pulse-forming circuit 44. This duration of the train of firing pulses reliably ensures the firing of the power SCR 5 notwithstanding transients and other vagaries in the power circuit 1. Also, a relatively high current level is provided for the base 8 to cathode 7 circuit of the SCR 5. Nevertheless, due to the short duration of each of the pulses and to their high frequency, the long train of firing pulses subjects the gate 8 to cathode 7 circuit of the power SCR 5 to a powerload well below the rated capacity for the power SCR 5.

The translation of the information in the command signal appearing as a DC magnitude to a proportional firing angle is effected in the phase shift circuit where the magnitude of the command signal determines the firing time of the phase shift unijunction transistor 34. Since the firing time of the phase shift unijunction transistor 34 actually depends upon the charge level of a timing capacitor 28, any transients or a noise appearing in the command signal or in the reference input signal will not effect the firing time of the phase shift unijunction transistor 34 unless the electrical noise or transient is of substantial duration and carries substantial amounts of power. In addition, the positive portion of the asymmetrical reference signal is clipped by the zener diode 39 that is connected across the phase shift unijunction transistor 34 with the result that noise energy of any substantial magnitude is shunted to the ground, and is not transmitted to the gate 46 of the sensitive SCR 47 in the pulse forming circuit 44. Again in the pulse-forming circuit 44 a zener diode 45 shunts out and clips the output pulse coming from the asymmetrical reference signal, and consequently excessive noise or transient, will be shunted to the ground and the output pulse from the pulse-forming circuit 44 to the pulse-firing circuit 52 will have a uniform magnitude. Inasmuch as the energy for the train of firing pulses comes from the 18-volt DC source, the firing pulse is practically completely isolated from input signals and influence of any noise. The adjustability of the timing potentiometer 31 and the current-limiting potentiometer 26 in the phase shift circuit makes this entire control circuit readily adapted to a broad range of command signal and reference signal magnitudes without affecting its essential function. Similarly, the current and voltage magnitude needs of the controlled rectifier 5 to be fired by the circuit of the present invention are readily met by employing a DC source on the DC input terminal 60 that is commensurate to those needs. Hence, a firing circuit embodying the present invention can be a highly adaptable and versatile standard unit. Finally, the control circuit embodying the present invention is characterized by its economy of components and utilization of those solid-state and electrical components that are most readily available, economical and reliable.

In the foregoing illustration and description of the preferred embodiment of the invention, the invention is described, as is the manner and process of making and using it in such full, clear, concise and exact terms so as to enable any person skilled in the art to which it pertains, or with which it is most nearly connected to make and use the same, and it sets forth the best mode contemplated by the inventors for carrying out their invention. By contrast, however, the subject matter which the inventors regard as their invention is particularly pointed out and distinctly claimed in the claims that follow at the conclusion of this specification.

We claim:

1. A firing circuit for a controlled rectifier comprising the combination of a command signal source generating a command signal of varying magnitude;

a reference signal source generating a reference signal of desired frequency and phase;

a phase shift circuit including a timing capacitor connected to said command signal source to be charged by said command signal, and a first switching device connected to said reference signal and to said timing capacitor responsive to a predetermined charge level on said timing capacitor;

a pulse-forming circuit containing a second switching device with a control element connected to said first switching device in said phase shift circuit to transmit a pulse of electrical energy when said first switching device discharges said capacitor;

and a pulse-firing circuit containing an oscillator with an oscillator capacitor and an output-coupling means to transmit a train of firing signals responsive to a charge on said oscillator capacitor, said oscillator capacitor being connected to said pulse-forming circuit to be charged by said pulse of electrical energy.

2. A firing circuit for a controlled rectifier as set forth in claim 1 wherein said first switching device is a unijunction transistor with its base circuit connected to said reference signal source, said timing capacitor is also connected to be charged by said reference signal and is connected to an emitter of said unijunction transistor, and a zener diode is connected across said base circuit of said unijunction transistor.

3. A firing circuit for a controlled rectifier as set forth in claim 2 wherein said reference signal source includes an input terminal connected to receive an AC signal and a restorer capacitor and blocking diode connected in series to said terminal to insert a DC level in said AC signal to make said reference signal asymmetrical with a positive portion of more than 180° duration.

4. A firing circuit for a controlled rectifier as set forth in claim 1 wherein said second switching device is an SCR with its anode-cathode circuit connected to said reference signal source and its gate connected to said controlled current valve of said phase shift circuit to be fired thereby;

and said oscillator capacitor in said pulse-firing circuit is connected to said anode-to-cathode circuit of said SCR to be charged when said SCR conducts.

5. A firing circuit for a controlled rectifier as set forth in claim 1 wherein said oscillator in said pulse-firing circuit includes a unijunction transistor with an emitter and a base-one and a base-two, said emitter being connected to said oscillator capacitor;

and said pulse-firing circuit includes a DC power source and an amplifier transistor with a base and a collector-emitter circuit, said DC power source being connected to said base-two of said unijunction transistor and to said collector-emitter circuit of said amplifier transistor, and said base of said amplifier transistor is connected to said base-one of said unijunction transistor, and said output-coupling means is connected to said collector-emitter circuit of said amplifier transistor.

6. A firing circuit for a controlled rectifier as set forth in claim 3 wherein said pulse-forming circuit includes a zener diode connected across said blocking diode in said reference signal source, an SCR with a gate connected to said base circuit of said unijunction transistor in said phase shift circuit and an anode connected to said reference signal source and a cathode connected to said zener diode.

7. A firing circuit for a controlled rectifier as set forth in claim 6 wherein said oscillator includes a unijunction transistor with an emitter connected to said oscillator capacitor and a base circuit;

said oscillator capacitor is connected to said anode of said SCR in said pulse-forming circuit to be charged when said SCR conducts;

said pulse-firing circuit includes an input terminal connected to a DC source and to said base circuit of said unijunction transistor, and an amplifier transistor with a collector-emitter circuit connected to said input terminal and with a base connected to said base circuit of said unijunction transistor to be controlled by emitter-to-base conductivity of said unijunction transistor;

and said output-coupling means is a transformer with a primary connected to said collector-emitter circuit of said amplifier transistor.